United States Patent
Cui et al.

(10) Patent No.: US 10,051,535 B2
(45) Date of Patent: Aug. 14, 2018

(54) METHOD AND DEVICE FOR DETECTING NEIGHBORING CELL IN CELL RESELECTION PROCESS

(71) Applicant: Beijing Xiaomi Mobile Software Co., Ltd., Beijing (CN)

(72) Inventors: Hengbin Cui, Beijing (CN); Guoquan Zhang, Beijing (CN); Long Sun, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/467,910

(22) Filed: Mar. 23, 2017

(65) Prior Publication Data

US 2017/0289875 A1 Oct. 5, 2017

(30) Foreign Application Priority Data

Mar. 30, 2016 (CN) .......................... 2016 1 0192068

(51) Int. Cl.
*H04W 76/30* (2018.01)
*H04W 36/08* (2009.01)
(Continued)

(52) U.S. Cl.
CPC ....... *H04W 36/08* (2013.01); *H04W 36/0072* (2013.01); *H04W 36/38* (2013.01);
(Continued)

(58) Field of Classification Search
CPC ... H04W 48/16; H04W 84/045; H04W 16/14; H04W 88/06
See application file for complete search history.

(56) References Cited

U.S. PATENT DOCUMENTS 8,914,029 B2 * 12/2014 Yang ................ H04W 36/0083
370/328
9,357,448 B1 * 5/2016 Narendran ............ H04W 36/04
(Continued)

FOREIGN PATENT DOCUMENTS

CN  101409920 A  4/2009
CN  101820614 A  9/2010
(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 9)," 3GPP TS 36.304 V9.4.0, dated Sep. 2010.

(Continued)

*Primary Examiner* — Dung Hong
(74) *Attorney, Agent, or Firm* — Finnegan, Henderson, Farabow, Garrett & Dunner LLP (57) ABSTRACT

The present disclosure relates to a method and device for detecting a neighboring cell in a cell reselection process. The method includes: receiving a message instructing the user equipment to switch from a connected state to an idle state, the message including a first frequency band group which further includes one or more frequency bands; updating a second frequency band group stored in the user equipment, according to the first frequency band group; and when the cell reselection process is performed by the user equipment, detecting a neighboring cell on at least one frequency band in the updated second frequency band group.

6 Claims, 7 Drawing Sheets

(51) Int. Cl.
*H04W 36/38* (2009.01)
*H04W 36/00* (2009.01)
*H04W 76/06* (2009.01)
*H04W 48/16* (2009.01)

(52) U.S. Cl.
CPC ........... *H04W 48/16* (2013.01); *H04W 76/06* (2013.01); *H04W 76/30* (2018.02)

(56) References Cited

U.S. PATENT DOCUMENTS

| | | | | |
|---|---|---|---|---|
| 2009/0170440 | A1* | 7/2009 | Eyuboglu | H04W 36/06 455/63.3 |
| 2012/0094679 | A1* | 4/2012 | Rao | H04W 48/16 455/450 |
| 2013/0294416 | A1* | 11/2013 | Li | H04W 36/30 370/332 |
| 2014/0141780 | A1* | 5/2014 | Yang | H04W 36/0061 455/436 |
| 2015/0045023 | A1* | 2/2015 | Rattner | H04W 48/16 455/434 |
| 2015/0109918 | A1 | 4/2015 | Sharma et al. | |
| 2016/0255564 | A1* | 9/2016 | Yang | H04W 4/06 455/436 |
| 2016/0366622 | A1* | 12/2016 | Yang | H04W 36/0083 |

FOREIGN PATENT DOCUMENTS

| | | |
|---|---|---|
| CN | 101990184 B | 9/2014 |
| RU | 2292665 C2 | 1/2007 |
| WO | WO 2010/098264 A1 | 9/2010 |
| WO | WO 2010/103750 A1 | 9/2010 |
| WO | WO-2012/138283 A2 | 10/2012 |
| WO | WO 2015/167673 A1 | 11/2015 |

OTHER PUBLICATIONS

Extended European Search Report of European Patent Application No. 17154963.7, from the European Patent Office, dated Jul. 19, 2017.

International Search Report of PCT/CN2016/100076, mailed from the State Intellectual Property Office of China dated Dec. 23, 2016.

3GPP Technical Specification Group Radio Access Network; User Equipment (UE) procedures in idle mode and procedures for cell reselection in connected mode (Release 6) 3GPP TS 25.304 V6.10. 0, dated Mar. 2008.

LG Electronics Inc. Possible enhancement for idle mode UE to avoid in-device coexistence interference 3GPP TSG-RAN2 Meeting 472, R2-106564, Nov. 15-Nov. 19, 2010.

* cited by examiner

METHOD AND DEVICE FOR DETECTING NEIGHBORING CELL IN CELL RESELECTION PROCESS

CROSS-REFERENCE TO RELATED APPLICATION

This application is based on and claims priority to Chinese Patent Application No. 201610192068.3, filed Mar. 30, 2016, the entire contents of which are incorporated herein by reference.

TECHNICAL FIELD

The present disclosure relates to the technical field of mobile communication and, more particularly, to a method and a device for detecting a neighboring cell in a cell reselection process.

BACKGROUND

In a mobile communication network, user equipment (UE) usually performs cell reselection in an idle state, in order to reside in a cell with better signals. Before performing the cell reselection, it is necessary for the UE to detect one or more neighboring cells. Conventionally, when the UE is in the idle state, the UE detects a neighboring cell according to frequency bands assigned by the communication system in which the UE operates. That is, the UE monitors the signal quality of the system-assigned frequency bands other than the frequency band corresponding to the cell in which the UE currently resides. When a monitored frequency band continuously has a better signal quality than the cell in which the UE currently resides, the UE switches to the cell corresponding to the frequency bands with better signal quality. In practical applications, for the purpose of optimizing load balance, a dedicated signal is used to instruct the UE to detect the signal quality of only a few dedicated frequency bands.

Typically, there is a valid time duration associated with the dedicated frequency bands. When the dedicated frequency bands are valid, the UE ignores other frequency bands. However, the valid time duration of the dedicated frequency bands is usually long enough that when the UE moves fast, the dedicated frequency bands do not expire even after the UE switches to a new cell. If the unexpired dedicated frequency bands are different from the frequency band(s) of the neighboring cell(s) surrounding the newly switched cell, the UE cannot detect the neighboring cell(s) based on the unexpired dedicated frequency band.

SUMMARY

According to a first aspect of the present disclosure, there is provided a method performed by user equipment to detect a neighboring cell in a cell reselection process, the method comprising: receiving a message instructing the user equipment to switch from a connected state to an idle state, the message including a first frequency band group which further includes one or more frequency bands; updating a second frequency band group stored in the user equipment, according to the first frequency band group; and when the cell reselection process is performed by the user equipment, detecting a neighboring cell on at least one frequency band in the updated second frequency band group.

According to a second aspect of the present disclosure, there is provided a method performed by a base station to support user equipment detecting a neighboring cell in a cell reselection process, the method comprising: detecting whether user equipment satisfies a condition for switching from a connected state to an idle state; and when the user equipment satisfies the condition, sending to the user equipment a message for instructing the user equipment to switch from the connected state to the idle state, the message including a frequency band group which further includes one or more frequency bands.

According to a third aspect of the present disclosure, there is provided a device applied in user equipment for detecting a neighboring cell in a cell reselection process, the device comprising: a processor; and a memory for storing instructions executable by the processor; wherein the processor is configured to: receive a message instructing the user equipment to switch from a connected state to an idle state, the message including a first frequency band group which further includes one or more frequency bands; update a second frequency band group stored in the user equipment, according to the first frequency band group; and when the cell reselection process is performed by the user equipment, detect a neighboring cell on at least one frequency band in the updated second frequency band group.

According to a fourth aspect of the present disclosure, there is provided a device for use in a base station to support user equipment detecting a neighboring cell in a cell reselection process, the device comprising: a processor; and a memory for storing instructions executable by the processor; wherein the processor is configured to: detect whether user equipment satisfies a condition for switching from a connected state to an idle state; and when the user equipment satisfies the condition, send to the user equipment a message for instructing the user equipment to switch from the connected state to the idle state, the message including a frequency band group which further includes one or more frequency bands.

It is to be understood that the forgoing general description and the following detailed description are illustrative and explanatory only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Exemplary embodiments will now be illustrated in detail, examples of which are illustrated in the accompanying drawings. The following description refers to the accompanying drawings in which the same numbers in different drawings represent the same or similar elements, unless otherwise described. The implementations described in the following exemplary embodiments do not represent all of the implementations consistent with the present disclosure. Instead, they are only examples of devices and methods consistent with aspects of the present disclosure as recited in the appended claims.

Figure 1:
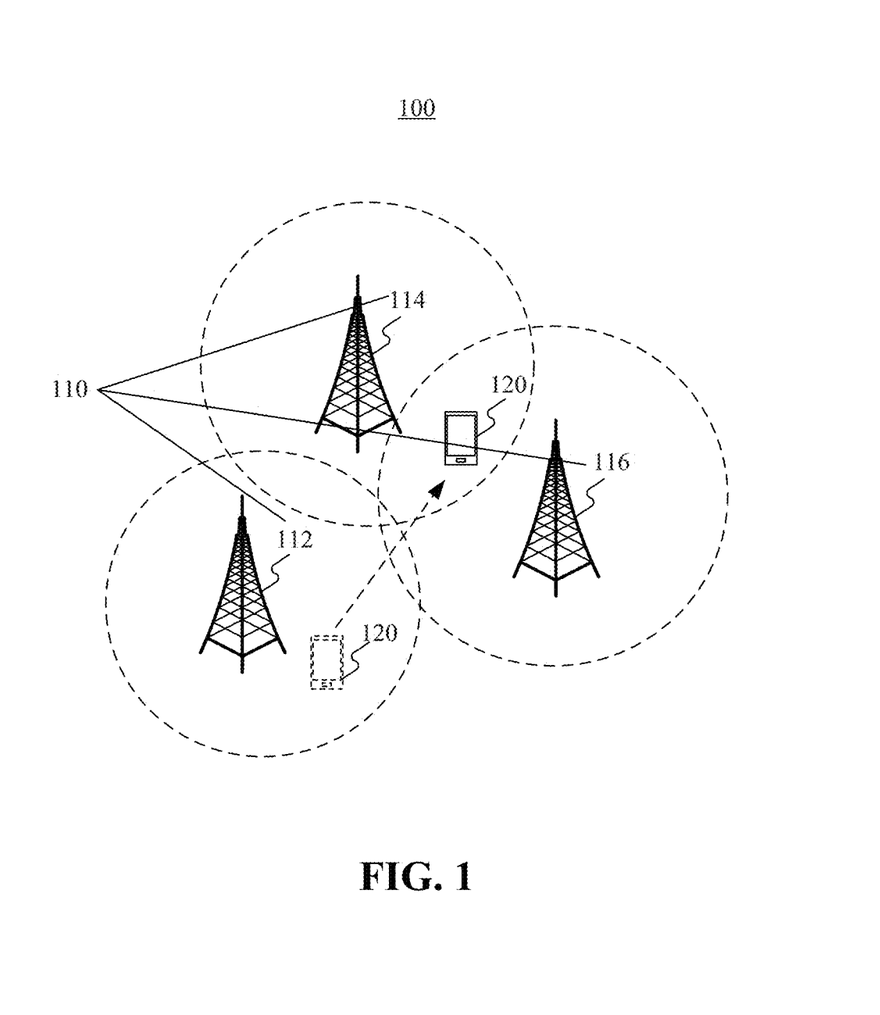
FIG. 1 is a schematic diagram illustrating an implementation environment for detecting a neighboring cell in a cell reselection process, according to an exemplary embodiment.

FIG. 1 is a schematic diagram illustrating an implementation environment 100 for detecting a neighboring cell in a cell reselection process, according to an exemplary embodiment. Referring to FIG. 1, the environment 100 includes one or more base stations 110 (e.g., base stations 112, 114, and 116), and user equipment (UE) 120. The base stations 110 and the UE 120 are part of a communication system.

The base stations 110 are configured to provide mobile communication services. In a cellular communication network, each base station 110 supports one or more cells, and the cells supported by multiple base stations 110 form a communication network. Each base station 110 provides communication service at a particular frequency band to UE 120 located within a certain range (hereinafter referred to as a "communication range") of the base station 110. For example, as shown in FIG. 1, the communication range of each base station 110 corresponds to the area encompassed by a dotted-line circle whose center coincides with the location of the base station 110. The present disclosure does not limit the number of the base stations 110, the sizes of the communication ranges covered by the base stations 110, and the relative positions of the base stations 110. The base stations 110 communicate with the UE 120 by wireless signals.

Consistent with the disclosed embodiments, different base stations 110 may operate within different frequency bands. For example, referring to FIG. 1, the frequency band of the cell supported by the base station 112 is $A_{O1}$, the frequency band of the cell supported by the base station 114 is $A_{O2}$, and the frequency band of the cell supported by the base station 116 is $A_{O3}$.

In the above example, when the UE 120 is in the communication range covered by the base station 112, the UE 120 uses the frequency band $A_{O1}$ to access the base station 112. When the UE 120 moves from a location covered by the base station 112 (represented by the UE 120 in dotted line in FIG. 1) to a new location covered by the base station 114 and base station 116 simultaneously, the UE 120 may be switched to access one of the base stations 114 and 116, based on factors such as load optimization. As described in more detail below, if the UE 120 switches from a connected state to an idle state at the time of moving to the new location, a message may be sent to the UE 120 to update a frequency band group stored locally in the UE 120. The UE 120 then detects one or more neighboring cells according to the updated frequency band group, detects signal strengths of the detected neighboring cells, and selects the neighboring cell with the strongest signal to access the communication network.

UE 120 is a device configured to communicate with any of the base stations 112-116 for accessing the cellular communication network formed by the base stations 112-116. For example, the UE 120 may be a cell phone, a laptop computer, a tablet computer, a wearable smart device, an on-board computer in a vehicle, or a smart aircraft.

Consistent with the disclosed embodiments, the base stations 112-116 and the UE 120 are used in a cellular communication network, such as a network operating based on the Long Term Evolution (LTE) or Long Term Evolution Advanced (LTE-Advanced) mobile communication standard, or a network using the Voice on Long Term Evolution (VoLTE) technology.

Next, the technical solutions provided by various embodiment of the present disclosure are introduced and illustrated in reference to the environment 100.

Figure 2:
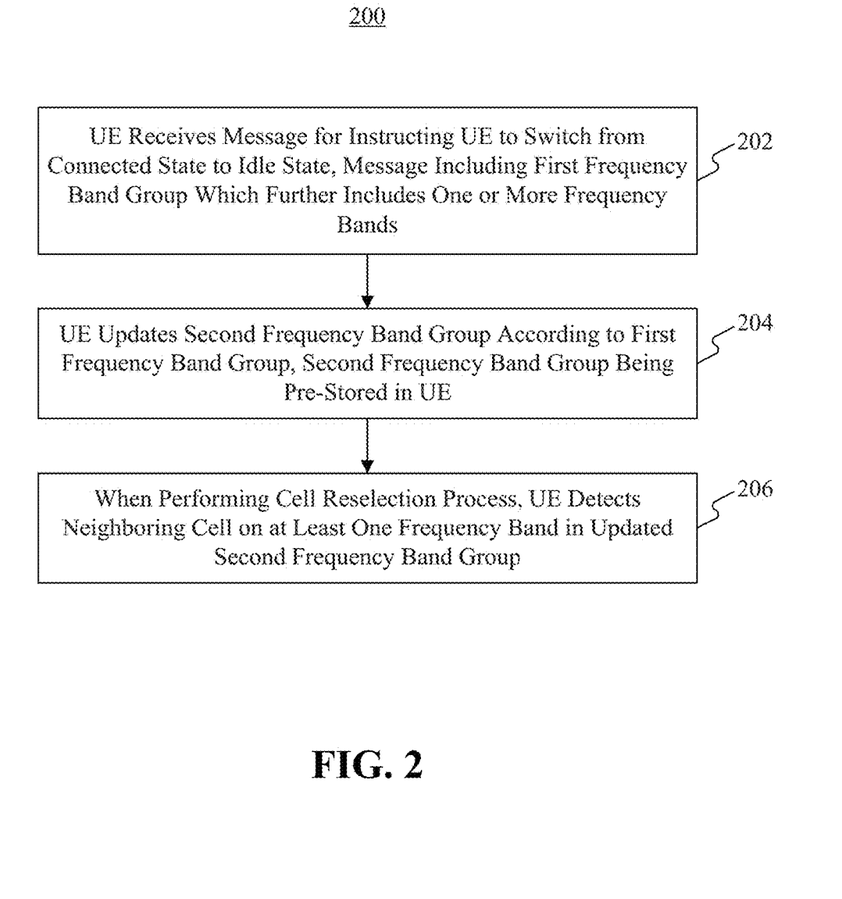
FIG. 2 is a flowchart of a method for detecting a neighboring cell in a cell reselection process, according to an exemplary embodiment.

FIG. 2 is a flowchart of a method 200 for detecting a neighboring cell in a cell reselection process, according to an exemplary embodiment. The method 200 is performed by user equipment, such as the UE 120 (FIG. 1). Referring to FIG. 2, the method 200 includes the following steps 202-206.

In step 202, the UE 120 receives a message for instructing the UE 120 to switch from a connected state to an idle state. The message includes a first frequency band group which further includes at least one frequency band.

In step 204, the UE 120 updates a second frequency band group according to the first frequency band group. The second frequency band is pre-stored in the UE 120

In step 206, when performing cell reselection, the UE 120 detects a neighboring cell on at least one frequency band in the updated second frequency band group.

Figure 3:
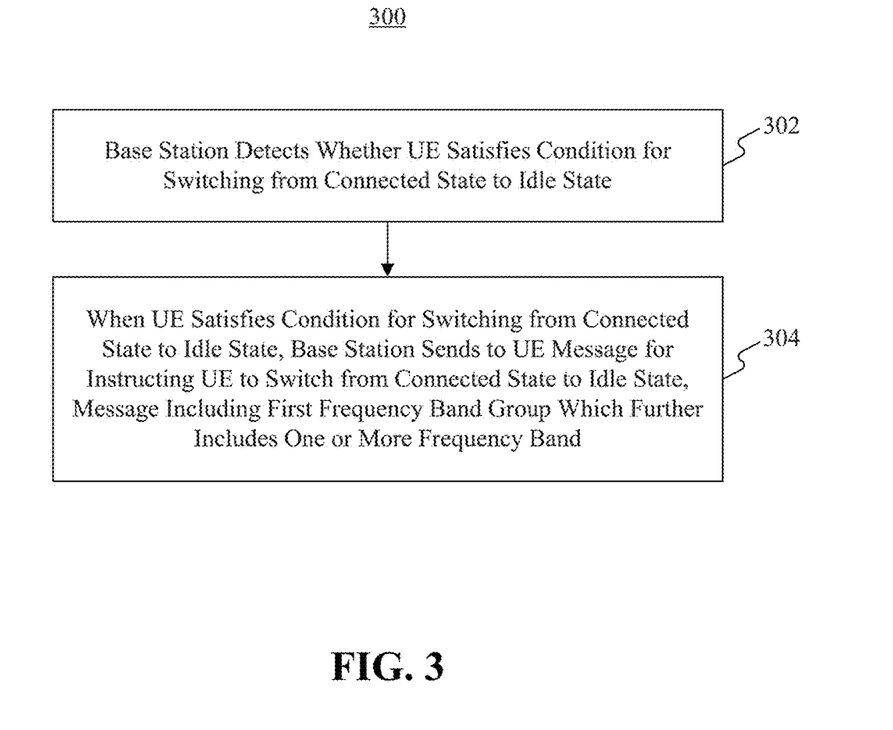
FIG. 3 is a flowchart of a method for detecting a neighboring cell in a cell reselection process, according to an exemplary embodiment.

FIG. 3 is a flowchart of a method 300 for detecting a neighboring cell in a cell reselection process, according to an exemplary embodiment. The method 300 is performed by one or more base stations, such as one or more of the base stations 110 (FIG. 1). Referring to FIG. 3, the method 300 includes the following steps 302-304.

In step 302, the base station 110 detects whether the UE 120 satisfies a condition for switching from a connected state to an idle state.

In step 304, when the UE 120 satisfies the condition for switching from the connected state to the idle state, the base station 110 sends to the UE 120 a message for instructing the UE 120 to switch from the connected state to the idle state. The message includes a first frequency band group which further includes at least one frequency band.

Figure 4:
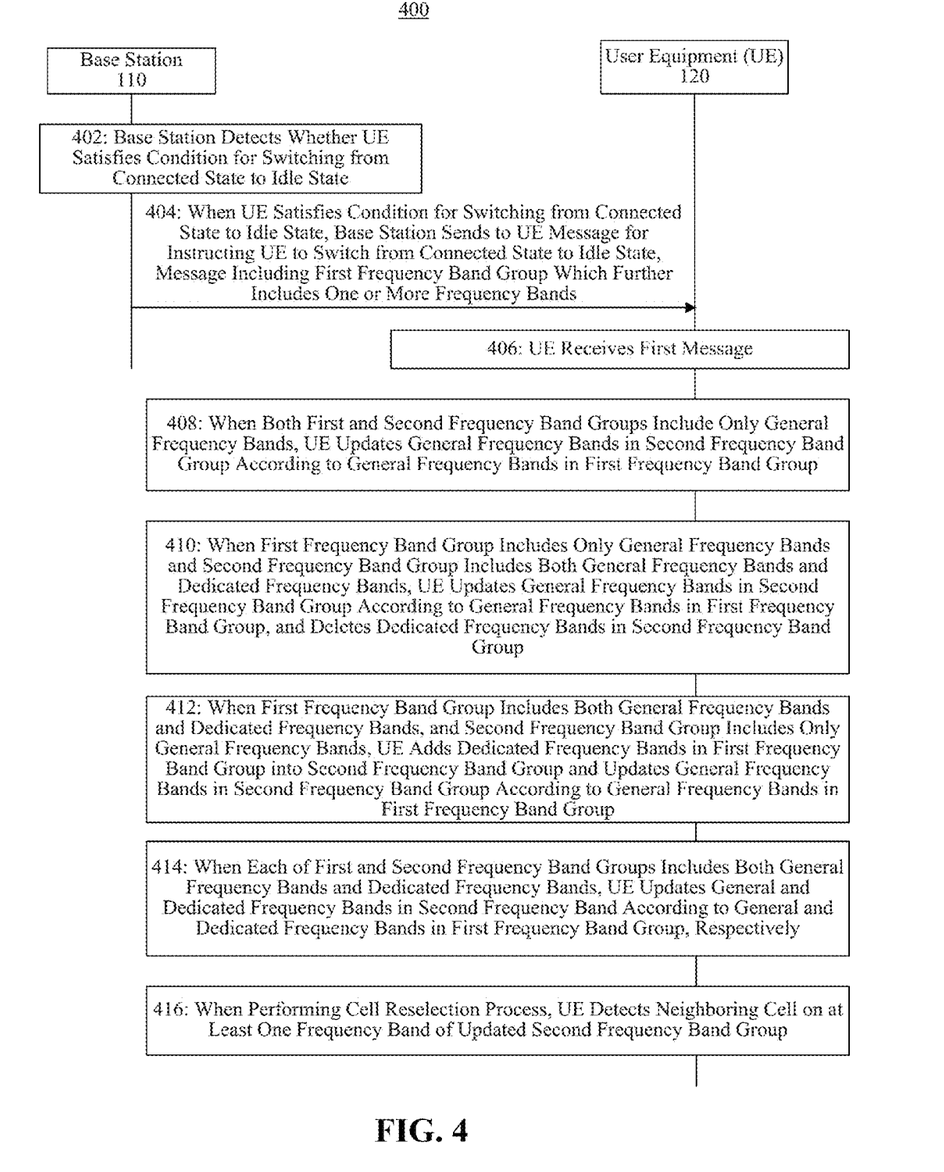
FIG. 4 is a flowchart of a method for detecting a neighboring cell in a cell reselection process, according to an exemplary embodiment.

FIG. 4 is a flowchart of a method 400 for detecting a neighboring cell in a cell reselection process, according to an exemplary embodiment. For example, the method 400 may be performed in the environment 100 (FIG. 1). Referring to FIG. 4, the method 400 includes the following steps 402-416.

In step 402, the base station 110 detects whether the UE 120 satisfies a condition for switching from a connected state to an idle state.

The base station 110 detects whether the UE 120 satisfies the condition for switching from the connected state to the idle state, based on the data exchange activity between the base station 110 and the UE 120. For example, the method 400 starts with the UE 120 in a connected state, in which the UE 120 maintains a communication connection with the base station 110. If there has been no data exchange between the UE 120 and the base station 110 for a predetermined period of time, the base station 110 considers that the UE 120 is ready for switching from the connected state to the idle state. Conversely, if the UE 120 and the base station 110 still keep an active data exchange, the base station 110 considers that the UE 120 does not satisfy the condition for switching from the connected state to the idle state. The exchanged data between the UE 120 and the base station 110 includes but is not limited to data packets generated during the UE 120's access of a network supported by the base station 110, or voice data packets exchanged between the UE 120 and other devices. For example, the data packets may be generated when a user uses the UE 120 to browse the Internet, or when a user uses the UE 120 to make a voice call or a video call to other people.

In step 404, when the UE 120 satisfies the condition for switching from the connected state to the idle state, the base station 110 sends to the UE 120 a message for instructing the UE 120 to switch from the connected state to the idle state. The message includes a first frequency band group which further includes one or more frequency bands.

Consistent with the disclosed embodiments, when the UE 120 accesses a cell supported by the base station 110, the UE 120 decides whether to enter a connected state or an idle state according to whether it is needed to exchange data with the base station 110. The UE 120 stays in the connected state when the UE 120 needs to exchanges data with the base station 110, in order to keep connected to the network supported by the base station 110. After the data exchange between the UE 120 and the base station 110 is completed, the base station 110 sends the message to the UE 120, to instruct the UE 120 to switch from the connected state to the idle state. After receiving the message, the UE 120 switches to the idle state accordingly. As such, the power of the UE 120 can be saved and communication resource, e.g., frequency bandwidth, originally occupied by the UE 120 can be released.

As described above, the first frequency band group contained in the message includes one or more frequency bands. The first frequency band group may include as many frequency bands as possible, to ensure the UE 120 detects all the frequency bands used for detecting a neighboring cell. For example, in some embodiments, a communication system uses a total of twenty frequency bands to provide network service. Accordingly, the first frequency band group is configured to include a majority or all of the twenty frequency bands. As another example, if the communication system uses a total of twenty frequency bands and ten of them cover the current location of the UE 120, then the first frequency band group may be configured to include a majority or all of the ten frequency bands that cover the current location of the UE 120.

In step 406, the UE 120 receives the message from the base station 110.

Consistent with the disclosed embodiments, the UE 120 locally stores a second frequency band group for use to detect a neighboring cell in a cell reselection process. The second frequency band group includes one or both of the following two kinds of frequency bands. A first kind of frequency bands is not designated by the communication system in which the UE 120 needs to detect a neighboring cell. As such, the first kind of frequency bands is also called general frequency bands, which are detected and updated by the UE 120 based on the broadcast messages sent from the base station 110. A second kind of frequency bands is designated by the communication system in which the UE 120 detects a neighboring cell. As such, the second kind of frequency bands is also called dedicated frequency bands, which are sent by the base station 110 through dedicated signals. For example, to achieve load balance, the base station 110 may send a dedicated signal containing certain dedicated frequency bands to the UE 120. The dedicated signal also indicates a valid time limit for the dedicated frequency bands. Within the valid time limit, the UE 120 ignores the general frequency bands and instead uses the dedicated frequency bands to detect a neighboring cell. After the valid time limit is reached, the dedicated frequency bands expire, and the UE 120 returns to use the general frequency bands for the neighboring cell detection until the next dedicated signal is received. In various embodiments, the dedicated frequency bands contained in the dedicated signal may be part of the general frequency bands stored locally in the UE 120, or partially overlap with the locally stored general frequency bands. For example, the general frequency bands in a locally stored second frequency band group include four frequency bands a, b, c and d, while the dedicated signal received by the UE 120 may include only frequency bands a and b, or only frequency bands a and f.

In the disclosed embodiments, the frequency band group in the message may include only the general frequency bands, or include both the general and dedicated frequency bands. Under these two circumstances, the UE 120 updates the second frequency band group according to one of the following steps 408-414.

In step 408, when both the first and second frequency band groups include only general frequency bands, the UE 120 updates the general frequency bands in the second frequency band group according to the general frequency bands in the first frequency band group.

In some embodiments, the UE 120 updates the general frequency bands in the second frequency band group to be the general frequency bands in the first frequency band group.

When the UE 120 moves to a new location and the locally stored general frequency bands in the second frequency band group are not updated, it is possible that the UE 120 cannot detect the neighboring cells corresponding to the locally stored general frequency bands, and thus cannot perform the cell reselection. Consistent with the disclosed embodiments, the base station 110 sends the message to the UE 120 when detecting the UE 120 enters the idle state, such that the UE 120 can update the general frequency bands locally stored in the UE 120 according to the general frequency bands in the message, so as to ensure that the UE 120 detects a neighboring cell successfully.

In step 410, when the first frequency band group includes only general frequency bands and the second frequency band group includes both general frequency bands and dedicated frequency bands, the UE 120 updates the general frequency bands in the second frequency band group according to the general frequency bands in the first frequency band group, and deletes the dedicated frequency bands in the second frequency band group.

In some embodiments, the UE 120 updates the general frequency bands in the second frequency band group to be the general frequency bands in the first frequency band group, and deletes the dedicated frequency bands in the second frequency band group.

When the UE 120 moves to a new location and the dedicated frequency bands in the second frequency band group have not expired, even if the general frequency bands in the second frequency band group is updated timely, the UE 120 still ignores the updated general frequency bands and uses the unexpired dedicated frequency bands to detect a neighboring cell. As such, it is possible that the UE 120 cannot detect the neighboring cell corresponding to the unexpired dedicated frequency bands, and thus cannot perform the cell reselection. Consistent with the disclosed embodiments, after the message is received, in addition to updating the locally stored general frequency bands according to the general frequency bands in the message, the UE 120 also deletes the locally stored unexpired dedicated frequency bands, in order to ensure that the UE 120 uses the updated general frequency bands to detect a neighboring cell.

In step 412, when the first frequency band group includes both general frequency bands and dedicated frequency bands, and the second frequency band group includes only general frequency bands, the UE 120 adds the dedicated frequency bands in the first frequency band group into the second frequency band group and updates the general frequency bands in the second frequency band group according to the general frequency bands in the first frequency band group.

In some embodiments, the UE 120 updates the general frequency bands in the second frequency band group to be the general frequency bands in the first frequency band group, and adds the dedicated frequency bands in the first frequency band group into the second frequency band group.

In step 414, when each of the first and second frequency band groups includes both general frequency bands and dedicated frequency bands, the UE 120 updates the general and dedicated frequency bands in the second frequency band according to the general and dedicated frequency bands in the first frequency band group, respectively.

In some embodiments, the UE 120 updates the general frequency bands in the second frequency band group to be the general frequency bands in the first frequency band group, and updates the dedicated frequency bands in the second frequency band group to be the dedicated frequency bands in the first frequency band group.

When the UE 120 moves to a new location, for the purpose of optimizing network load balance, in addition to carrying the general frequency bands, the message also carries the dedicated frequency bands. The dedicated frequency bands carried by the message have a corresponding valid time limit. After the valid time limit is reached, the UE 120 continues to use the general frequency bands carried by the message to detect a neighboring cell until the next dedicated signal or next message is received.

In step 416, when performing the cell reselection process, the UE 120 detects a neighboring cell on at least one frequency band of the updated second frequency band group.

In some embodiments, the message also includes priorities of the frequency bands of the first frequency band group, and the UE 120 detects the neighboring cell on the one or more frequency bands according to their corresponding priorities. That is, when the message indicates the priorities associated with the general and/or dedicated frequency bands of the first frequency band group, the UE 120 performs the neighboring cell detection according to the priorities of the general and/or dedicated frequency bands of the updated second frequency band group.

For example, Table 1 below lists five general frequency bands in the first frequency band group and the priorities corresponding to the five general frequency bands.

TABLE 1

| | Frequency Band | | | | |
|---|---|---|---|---|---|
| | $A_{11}$ | $A_{12}$ | $A_{13}$ | $A_{14}$ | $A_{15}$ |
| Priority | Low | High | Middle | Middle | Low |

Referring to Table 1, when the UE 120 updates the general frequency bands of the second frequency band group and detects a neighboring cell according to the updated general frequency bands, the UE 120 first selects the frequency band $A_{12}$, which corresponds to the priority "high" and has the highest priority, to perform the neighboring cell detection. If the UE 120 detects that the signal strength of the neighboring cell corresponding to the frequency band $A_{12}$ reaches the threshold of performing cell reselection, the UE 120 switches from the currently accessed cell to the cell corresponding to the frequency band $A_{12}$. If the UE 120 detects no neighboring cell corresponding to the frequency band $A_{12}$, or that the signal strength of the neighboring cell corresponding to the frequency band $A_{12}$ does not reach the threshold of performing cell reselection, the UE 120 selects the frequency bands $A_{13}$ and $A_{14}$, both of which correspond to the priority "middle" and have the second highest priority, to perform the neighboring cell detection. If the UE 120 detects that only one neighboring cell corresponding to the frequency bands $A_{13}$ or $A_{14}$ has a signal strength reaching the threshold of performing cell reselection, the UE 120 switches from the currently accessed cell to the cell whose signal strength reaches the threshold of performing cell reselection. If the UE detects that the signal strengths of both the neighboring cell corresponding to the frequency band $A_{13}$ and the neighboring cell corresponding to the frequency band $A_{14}$ reach the threshold of neighboring cell detection, the UE 120 switches from the currently accessed cell to the neighboring cell having the higher signal strength or being detected first. If the UE 120 detects no neighboring cells corresponding to the frequency bands $A_{13}$ and $A_{14}$, or that the signal strengths of both the neighboring cell corresponding to the frequency band $A_{13}$ and the neighboring cell corresponding to the frequency band $A_{14}$ are below the threshold of neighboring cell detection, the UE 120 selects the frequency bands $A_{11}$ and $A_{15}$ corresponding to the priority "low" to perform the neighboring cell detection. If the UE 120 detects no neighboring cells corresponding to the frequency bands $A_{11}$ and $A_{15}$, or that the signal strengths of both the neighboring cell corresponding to the frequency band $A_{11}$ and the neighboring cell corresponding to the frequency band $A_{15}$ are below the threshold of performing cell reselection, the UE 120 keeps its connection to the current cell and ends the cell reselection.

Similarly, if the dedicated frequency bands in the first frequency band group also have their corresponding priorities, the process of detecting a neighboring cell according to the dedicated frequency bands and their priorities is similar to the process described above for detecting a neighboring cell according to the general frequency bands and their priorities, which will not be elaborated herein.

In some embodiments, the message is a radio resource control connection release (RRC Connection Release) message. Specifically, a designated data field in the RRC Connection Release message can be used to carry the first frequency band group. When the UE 120 receives the RRC Connection Release message and subsequently detects that the RRC Connection Release message does not contain the dedicated signaling field, the UE 120 detects a neighboring cell according to the general and/or dedicate frequency bands pre-stored in the UE 120. In contrast, when the UE 120 detects that the RRC Connection Release message contains the designated data field, the UE 120 first updates the second frequency band group according to first frequency band group in the designated data field, and then detects a neighboring cell according to the general and/or dedicated frequency bands in the updated second frequency band group.

It is understood the present disclosure's description in relation to the RRC Connection Release message is for illustration purpose only. The message may be any type of message that has the same or similar functions as the RRC Connection Release message. The present disclosure does not limit the implementations of the message.

Next, two exemplary implementations of the method 400 will be described. In the first implementation, referring to FIG. 1, the UE 120 is initially connected to the cell supported by the base station 112. To optimize load balance, the base station 112 sends a dedicated signal to the UE 120. The dedicated signal carries dedicated frequency bands that can be used by the UE 120 to detect a neighboring cell. For example, the frequency band of the cell supported by the base station 112 is $A_1$, and the frequency band of the cell supported by the base station 114 is $A_2$. Moreover, the dedicated signal only includes the dedicated frequency band $A_2$. After the UE 120 fast moves from the cell supported by the base station 112 to the cell supported by the base station 114, the UE 120 also switches from the cell supported by the base station 112 to the cell supported by the base station 114. If the UE 120 enters its idle state before the previously received dedicated frequency band expires, the UE 120 only detects cells on the dedicated frequency band $A_2$, i.e., cannot detect a neighboring cell on general frequency bands stored in the UE 120. However, the cell on the frequency band $A_2$ is the cell supported by the base station 114 and currently accessed by the UE 120. Thus, the UE 120 cannot perform the cell reselection before the dedicated frequency band $A_2$ expires.

According to the method 400, to solve the above-described problem, after the UE 120 switches from the cell supported by the base station 112 to the cell supported by the base station 114 and the base station 112 determines that there is no need to exchange data with the UE 120, the base station 112 sends a RRC Connection Release message to the UE 120, instructing the UE 120 to switch from the connected state to the idle state. The RRC Connection Release message includes the frequency bands (i.e., the first frequency band group) of the cells supported by one or more base stations located near the current location of the UE 120. When performing the cell reselection, the UE 120 detects a neighboring cell according to the one or more frequency bands included in the RRC Connection Release message. Therefore, the method 400 can solve the problem that the UE 120 is unable to detect a neighboring cell when the locally stored dedicated frequency band(s) has not expired and is different from the frequency bands of the neighboring cells surrounding the cell currently accessed by the UE 120.

In the second implementation, when a user of the UE 120 is in a fast moving vehicle such as a high-speed train, the UE 120 moves a long distance in a short time. As such, it is often that the general and/or dedicated frequency bands stored in the UE 120 are different from the frequency bands of the neighboring cells of the cell currently accessed by the UE 120. If the general frequency bands pre-stored in the UE 120 have not been updated to be the frequency bands of the neighboring cells surrounding the cell currently accessed by the UE 120, the UE 120 is unable to detect a neighboring cell according to the pre-stored general frequency bands even if the dedicated frequency bands pre-stored in the UE 120 have expired.

According to the method 400, to solve the above-described problem, after the UE 120 moves a long distance and the base station 110 (e.g., the base station 112 in FIG. 1) determines that there is no need to exchange data with the UE 120, the base station 110 sends a RRC Connection Release message to the UE 120, instructing the UE 120 to switch from the connected state to the idle state. The RRC Connection Release message also includes frequency bands (i.e., the first frequency band group) of various cells supported by the base stations 110 located near the current location of the UE 120. When performing the cell reselection, the UE 120 detects a neighboring cell according to the various frequency bands included in the RRC Connection Release message. This way, the method 400 can avoid the problem that the UE 120 is unable to detect a neighboring cell when the UE 120 travels a long distance in a short time and causes the general and/or dedicated frequency bands stored in the UE 120 to not be updated timely, such that both the stored general frequency bands and the stored dedicated frequency bands are different from the frequency bands of the neighboring cells surrounding the cell currently accessed by the UE 120.

In summary, the disclosed cell detection methods can be used to timely update the general frequency bands and/or dedicated frequency bands stored in the UE 120, when the UE 120 switches to a new cell and the pre-stored dedicated frequency bands have not expired, or when the UE 120 moves fast and the general frequency bands pre-stored in the UE 120 have not been updated. As such, the disclosed methods can avoid the problem that the UE 120 is unable to detect a neighboring cell due to the frequency band of the neighboring cell is different from the general and/or dedicated frequency bands stored in the UE 120. Accordingly, the disclosed methods improve the success rate for the UE 120 to detect a neighboring cell and ensure the stability of the communication connection of the UE 120.

Figure 5:
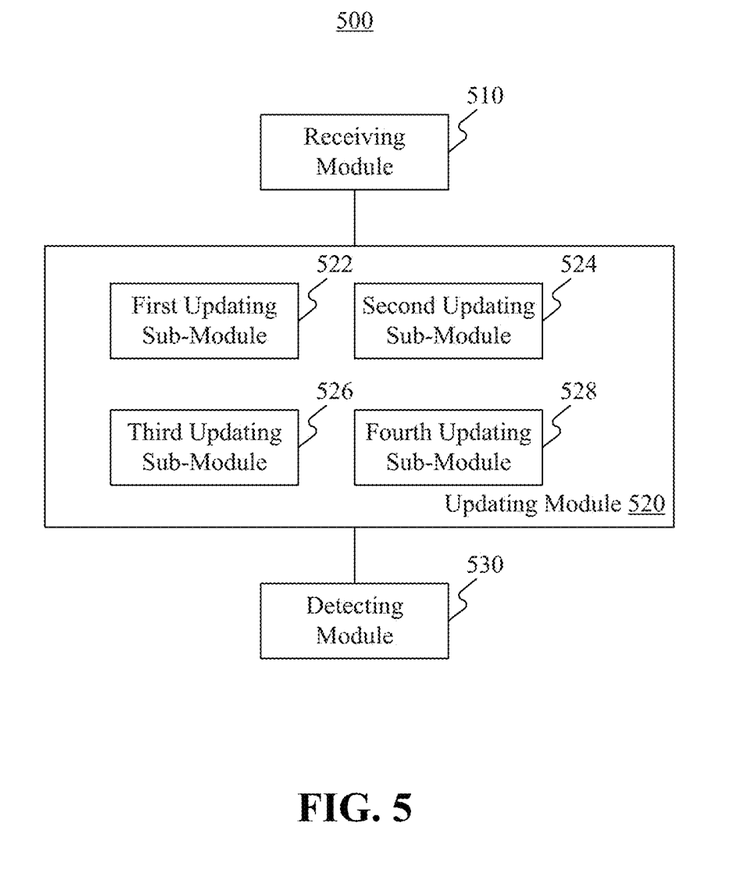
FIG. 5 is a block diagram of a device for detecting a neighboring cell in a cell reselection process, according to an exemplary embodiment.

FIG. 5 is a block diagram of a device 500 for detecting a neighboring cell in a cell reselection process, according to an exemplary embodiment. For example, the device 500 may be implemented as the UE 120 (FIG. 1) in the form of hardware, software, or a combination thereof. The device 500 performs all or some of the steps in the methods 200 or 400 that are performed by the UE 120. Referring to FIG. 5, the device 500 includes a receiving module 510, an updating module 520 and a detecting module 530.

The receiving module 510 is configured to receive a message for instructing the US 120 to switch from a connected state to an idle state. The message includes a first frequency band group which further includes one or more frequency bands.

In some embodiments, the message is a radio resource control connection release (RRC Connection Release) message.

The updating module 520 is configured to update a second frequency band group according to the first frequency band group. The second frequency band group is pre-stored in the UE 120.

The detecting module 530 is configured to, when the cell reselection process is performed by the UE 120, detect a neighboring cell on at least one frequency band of the updated second frequency band group.

In some embodiments, the message received by the receiving module 510 further includes priorities associated with the one or more frequency bands in the first frequency band group. Correspondingly, the detecting module 530 is further configured to detect a neighboring cell according to the priorities associated with the one or more frequency bands in the first frequency band group with which the second frequency band group has been updated.

In some embodiments, the updating module 520 further includes a first updating sub-module 522 and a second updating sub-module 524.

The first updating sub-module 522 is configured to update general frequency bands in the second frequency band group according to general frequency bands in the first frequency band group, when both the first and second frequency band groups include only the general frequency bands.

The second updating sub-module 524 is configured to update general frequency bands in the second frequency band group according to general frequency bands in the first frequency band group and delete dedicated frequency bands in the second frequency band group, when the second frequency band group includes both the general and dedicated frequency bands while the first frequency band group includes only the general frequency bands.

In some embodiments, the updating module 520 further includes a third updating sub-module 526 and a fourth updating sub-module 528.

The third updating sub-module 526 is configured to add dedicated frequency bands in the first frequency band group to the second frequency band group and update general frequency bands in the second frequency band group according to general frequency bands in the first frequency band group, when the second frequency band group includes only the general frequency bands while the first frequency band group includes both the general and dedicated frequency bands.

The fourth updating sub-module 528 is configured to update general and dedicated frequency bands in the second frequency band group according to general and dedicated frequency bands in the first frequency band group respectively, when each of the first and second frequency band groups includes both general and dedicated frequency bands.

Figure 6:
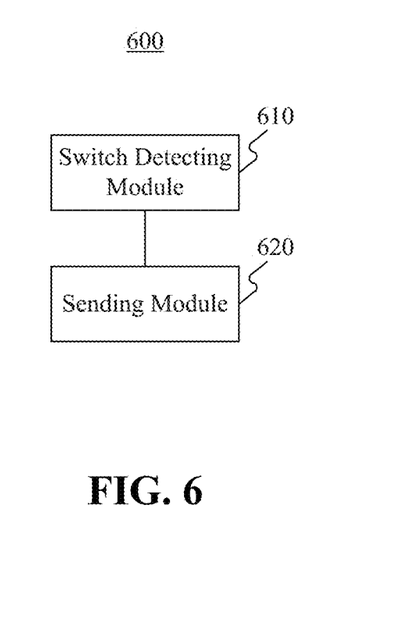
FIG. 6 is a block diagram of a device for detecting a neighboring cell in a cell reselection process, according to an exemplary embodiment.

FIG. 6 is a block diagram illustrating a device 600 for detecting a neighboring cell in a cell reselection process, according to an exemplary embodiment. The device 600 is implemented as the based station 100 (FIG. 1) in the form of software, hardware, or a combination thereof. The device 600 is configured to perform all or some of the steps in the methods 300 and 400. Referring to FIG. 6, the device 600 includes a switch detecting module 610 and a sending module 620.

The switch detecting module 610 is configured to detect whether the UE 120 satisfies a condition for switching from a connected state to an idle state.

The sending module 620 is configured to send to the UE 120 a message for instructing the UE 120 to switch from the connected state to the idle state when the UE 120 is determined to satisfy the condition for switching from the connected state to the idle state. The message includes a first frequency band group which further includes at least one frequency band. In some embodiments, the message may be a radio resource control connection release (RRC Connection Release) message.

It should be noted that when performing the method for detecting a neighboring cell in the cell reselection process, the device provided in the foregoing embodiments is only illustrated by means of the division of the foregoing various function modules. In practical applications, the foregoing function allocation may be completed by different function modules according to the actual needs, i.e., the structure of the device may be divided into different function modules to implement all or part of the described functions.

As to the device in the foregoing embodiments, the specific ways that the various modules perform operations have been described in detail in the embodiments related to the method, which will not be detailed herein.

Figure 7:
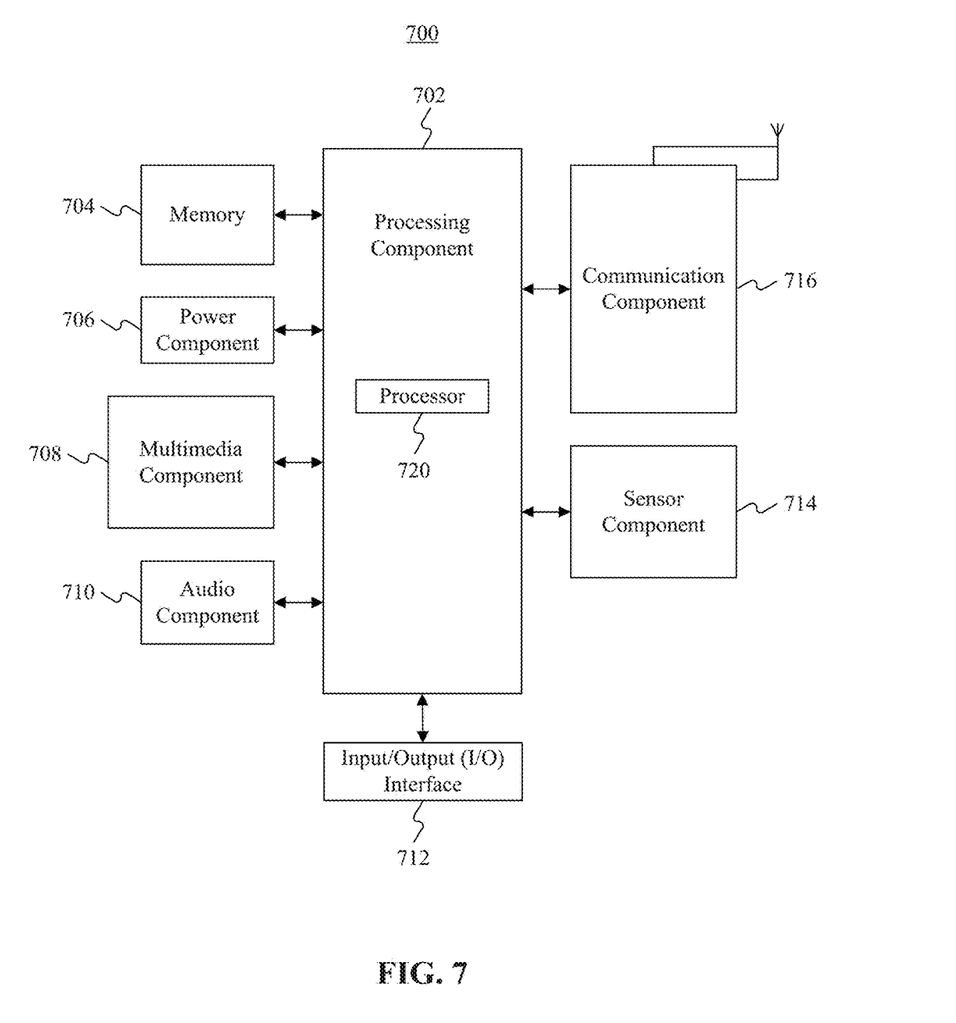
FIG. 7 is a block diagram of a device for detecting a neighboring cell in a cell reselection process, according to an exemplary embodiment.

FIG. 7 is a block diagram of a device 700 for detecting a neighboring cell in a cell reselection process, according to an exemplary embodiment. Consistent with the disclosed embodiments, the device may be implemented as user equipment, e.g., UE 120 (FIG. 1). For example, the device 700 may be an electronic device such as a smart phone, a wearable device, a smart television, and a terminal on board a vehicle.

Referring to FIG. 7, the device 700 includes one or more of the following components: a processing component 702, a memory 704, a power component 706, a multimedia component 708, an audio component 710, an input/output (I/O) interface 712, a sensor component 714, and a communication component 716.

The processing component 702 typically controls overall operation of the device 700, such as the operations associated with display, telephone call, data communications, camera operations and recording operations. The processing component 702 includes one or more processors 720 to execute instructions to perform all or some of the steps in the above described methods. Additionally, the processing component 702 includes one or more modules which facilitate the interaction between the processing component 702 and other components. For instance, the processing component 702 includes a multimedia module to facilitate the interaction between the multimedia component 708 and the processing component 702.

The memory 704 is configured to store various types of data to support the operation of the device 700. Examples of such data include instructions for any applications or methods operated on the device 700, contacts data, phonebook data, messages, images, videos, etc. The memory 704 may be implemented using any type of volatile or non-volatile memory devices or a combination thereof, such as a static random access memory (SRAM), an electrically erasable programmable read only memory (EEPROM), an erasable programmable read only memory (EPROM), a programmable read-only memory (PROM), a read-only memory (ROM), a magnetic memory, a flash memory, a magnetic disk or optical disk.

The power component 706 provides power to various components of the device 700. The power component 706 includes a power management system, one or more power sources, and any other components associated with the generation, management, and distribution of power in the device 700

The multimedia component 708 includes a screen providing an output interface between the device 700 and the user. In some embodiments, the screen includes a liquid crystal display (LCD) and/or a touch panel. If the screen includes the touch panel, the screen may be implemented as a touch screen to receive input signals from the users. The touch panel includes one or more touch sensors to sense touches, swipes, and other gestures performed on the touch panel. The touch sensor may not only sense a boundary of a touch or swipe action, but also detect the duration and pressure associated with the touch or swipe action. In some embodiments, the multimedia component 708 includes a front camera and/or a rear camera. When the device 700 is in an operation mode, such as a photographing mode or a video mode, the front camera and/or rear camera receives external multimedia data. Each of the front camera and the rear camera may be a fixed optical lens system or have focal length and optical zoom capability.

The audio component 710 is configured to output and/or input audio signals. For example, the audio component 710 includes a microphone configured to receive an external audio signal when the device 700 is in an operation mode, such as a call mode, a recording mode, or a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons include but are not limited to: a home button, a volume button, a starting button, and a locking button.

The sensor component 714 includes one or more sensors to provide various aspects of state assessments for the device 700. For instance, the sensor component 714 may detect an open/closed state of the device 700, relative positioning of components, such as the display and the keypad, of the device 700. The sensor component 714 may also detect a position change of the device 700 or a component thereof, a presence or absence of a contact between the user and the device 700, an orientation or acceleration/deceleration of the device 700, and a temperature change of the device 700. The sensor component 714 may include a proximity sensor configured to detect the presence of nearby objects without any physical contact. The sensor component 714 may further include a light sensor, such as a complementary metal oxide semiconductor (CMOS) or charge coupled device (CCD) image sensor, for use in imaging applications. In some embodiments, the sensor component 714 further includes an accelerometer sensor, a gyroscope sensor, a magnetic sensor, a pressure sensor, a microwave sensor, or a temperature sensor.

The communication component 716 is configured to facilitate the device 700 to communication, wired or wirelessly, with other devices. The device 700 can access a communication standard based wireless network, such as WiFi, 2G, 3G, 4G, 5G, LTE, LTE-Advanced, VoLTE, or a combination thereof. In one exemplary embodiment, the communication component 716 receives a broadcast signal from an external broadcast management system or broadcasts the associated information via a broadcast channel. In one exemplary embodiment, the communication component 716 further includes a near field communication (NFC) module to facilitate short-range communication. For example, the NFC module may be implemented based on radio frequency identification (RFID) technique, infrared data association (IrDA) technique, ultra-wideband (UWB) technique, Bluetooth (BT) technique, and other techniques.

In an exemplary embodiment, the device 700 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above described methods.

In an exemplary embodiment, there is also provided a non-transitory computer-readable storage medium including instructions, such as included in the memory 704, executed by the processor 720 of the device 700 to implement the above described methods. For example, the non-transitory computer-readable storage medium may be a ROM, a random access memory (RAM), a CD-ROM, a magnetic tape, a floppy disc, and an optical data storage device, etc.

Other embodiments of the present disclosure will be apparent to those skilled in the art from consideration of the specification and practice of the invention disclosed herein. The present disclosure is intended to cover any variations, uses or adaptations of the present disclosure, and these variations, uses, and adaptations follow the general principles of the present disclosure and include common general knowledge and conventional techniques of the art which are not disclosed herein. The specification and the embodiments are only considered as exemplary, and the true scope and spirit of the present disclosure are indicated by the following claims.

It should be appreciated that the present disclosure is not limited to the exact structures that have been described above and illustrated in the accompanying drawings, and that various modifications and changes can be made without departing from the scope thereof. It is intended that the scope of the present disclosure is only limited by the appended claims.

What is claimed is:

1. A method performed by user equipment to detect a neighboring cell in a cell reselection process, the method comprising:

receiving a message instructing the user equipment to switch from a connected state to an idle state, the message including a first frequency band group which further includes one or more frequency bands;

updating a second frequency band group stored in the user equipment, according to the first frequency band group; and when the cell reselection process is performed by the user equipment, detecting a neighboring cell on at least one frequency band in the updated second frequency band group, wherein the updating of the second frequency band group according to the first frequency band group further includes:

when the one or more frequency bands in the first frequency band group are undedicated frequency bands for detecting the neighboring cell and the second frequency band group includes only undedicated frequency bands for detecting the neighboring cell, updating the undedicated frequency bands in the second frequency band group according to the one or more frequency bands in the first frequency band group;

when the one or more frequency bands in the first frequency band group are undedicated frequency bands for detecting the neighboring cell and the second frequency band group includes both undedicated frequency bands and dedicated frequency bands for detecting the neighboring cell, updating the undedicated frequency bands in the second frequency band group according to the one or more frequency bands in the first frequency band group and deleting the dedicated frequency bands in the second frequency band group;

when the one or more frequency bands in the first frequency band group include both undedicated frequency bands and dedicated frequency bands for detecting the neighboring cell and the second frequency band group includes only undedicated frequency bands for detecting the neighboring cell, adding the dedicated frequency bands in the first frequency band group to the second frequency band group and updating the undedicated frequency bands in the second frequency band group according to the undedicated frequency bands in the first frequency band group; and when the one or more frequency bands in the first frequency band group include both undedicated frequency bands and dedicated frequency bands for detecting the neighboring cell and the second frequency band group includes both undedicated frequency bands and dedicated frequency bands for detecting the neighboring cell, updating the undedicated and dedicated frequency bands in the second frequency band group according to the undedicated and dedicated frequency bands in the first frequency band group, respectively.

2. The method of claim 1, wherein:
the message further includes priorities of the one or more frequency bands in the first frequency band group; and
the detecting of the neighboring cell on the at least one frequency band in the updated second frequency band group further includes:
detecting the neighboring cell according to the priorities of the one or more frequency bands in the first frequency band group.

3. The method of claim 1, wherein the message is a radio resource control connection release (RRC Connection Release) message.

4. A device applied in user equipment for detecting a neighboring cell in a cell reselection process, the device comprising:
a processor; and
a memory for storing instructions executable by the processor;
wherein the processor is configured to:
receive a message instructing the user equipment to switch from a connected state to an idle state, the message including a first frequency band group which further includes one or more frequency bands;
update a second frequency band group stored in the user equipment, according to the first frequency band group; and
when the cell reselection process is performed by the user equipment, detect a neighboring cell on at least one frequency band in the updated second frequency band group,
wherein in updating the second frequency band group according to the first frequency band group, the processor is further configured to:
when the one or more frequency bands in the first frequency band group are undedicated frequency bands for detecting the neighboring cell and the second frequency band group includes only undedicated frequency bands for detecting the neighboring cell, update the undedicated frequency bands in the second frequency band group according to the one or more frequency bands in the first frequency band group;

when the one or more frequency bands in the first frequency band group are undedicated frequency bands for detecting the neighboring cell and the second frequency band group includes both undedicated frequency bands and dedicated frequency bands for detecting the neighboring cell, update the undedicated frequency bands in the second frequency band group according to the one or more frequency bands in the first frequency band group and delete the dedicated frequency bands in the second frequency band group;

when the one or more frequency bands in the first frequency band group include both undedicated frequency bands and dedicated frequency bands for detecting the neighboring cell and the second frequency band group includes only undedicated frequency bands for detecting the neighboring cell, add the dedicated frequency bands in the first frequency band group to the second frequency band group and update the undedicated frequency bands in the second frequency band group according to the undedicated frequency bands in the first frequency band group; and when the one or more frequency bands in the first frequency band group include both undedicated frequency bands and dedicated frequency bands for detecting the neighboring cell and the second frequency band group includes both undedicated frequency bands and dedicated frequency bands for detecting the neighboring cell, update the undedicated and dedicated frequency bands in the second frequency band group according to the undedicated and dedicated frequency bands in the first frequency band group, respectively.

5. The device of claim 4, wherein:
the message further includes priorities of the one or more frequency bands in the first frequency band group; and
the processor is further configured to:
detect the neighboring cell according to the priorities of the one or more frequency bands in the first frequency band group.

6. The device of claim 4, wherein the message is a radio resource control connection release (RRC Connection Release) message.

* * * * *